United States Patent

Krutke

Patent Number: 5,606,608
Date of Patent: Feb. 25, 1997

[54] CELLULAR PHONE SUPPORTING DEVICE

[76] Inventor: Gerald M. Krutke, 1423 Columbus Ave., Sheboygan, Wis. 53083

[21] Appl. No.: 502,380

[22] Filed: Jul. 14, 1995

[51] Int. Cl.$^6$ ................................................. H04M 1/00
[52] U.S. Cl. ........................... 379/446; 379/454; 379/455
[58] Field of Search .............................. 379/454, 455, 379/426, 446, 447; 455/89, 90, 128

[56] References Cited

U.S. PATENT DOCUMENTS

| | | | |
|---|---|---|---|
| 3,370,236 | 2/1968 | Walker | 455/89 |
| 5,189,358 | 2/1993 | Tomura et al. | 455/89 |

OTHER PUBLICATIONS

ACME, Communications organizer, Apr. 10, 1975.

*Primary Examiner*—Thomas W. Brown
*Assistant Examiner*—Jack Chiang

[57] ABSTRACT

A device for receiving and supporting a bag-type cellular phone when removed from the bag. The inventive device includes a housing having a through-extending upper compartment for receiving a main body of a cellular telephone. The housing further includes a closed lower compartment for receiving a battery pack of the telephone, whereby organized operation of the telephone utilizing a handset or auxiliary microphone can be accomplished within a vehicle.

1 Claim, 3 Drawing Sheets

CELLULAR PHONE SUPPORTING DEVICE

BACKGROUND OF THE INVENTION

1. Field of the Invention

The present invention relates to mounting structures and more particularly pertains to a cellular phone supporting device for receiving and supporting a bag-type cellular phone when removed from the bag.

2. Description of the Prior Art

The use of mounting structures is known in the prior art. More specifically, mounting structures heretofore devised, and utilized are known to consist basically of familiar, expected and obvious structural configurations, notwithstanding the myriad of designs encompassed by the crowded prior art which have been developed for the fulfillment of countless objectives and requirements.

Known prior art mounting structures include U.S. Pat. No. 5,179,590; U.S. Pat. No. 4,435,522; U.S. Pat. No. 5,094,316; U.S. Des. Pat. No. 317,157; U.S. Des. Pat. No. 324,865; and U.S. Des. Pat. No. 297,733.

While these devices fulfill their respective, particular objectives and requirements, the aforementioned patents do not disclose a cellular phone supporting device for receiving and supporting a bag-type cellular telephone when removed from the bag which includes a housing having a through-extending upper compartment for receiving a main body of a cellular telephone, with the housing further including a closed lower compartment for receiving a battery pack of the telephone, whereby organized operation of the telephone utilizing a handset or auxiliary microphone can be accomplished.

In these respects, the cellular phone supporting device according to the present invention substantially departs from the conventional concepts and designs of the prior art, and in so doing provides an apparatus primarily developed for the purpose of receiving and supporting a bag-type cellular telephone.

SUMMARY OF THE INVENTION

In view of the foregoing disadvantages inherent in the known types of mounting structures now present in the prior art, the present invention provides a new cellular phone supporting device construction wherein the same can be utilized for organizing a bag-type cellular phone when the phone is removed from the bag. As such, the general purpose of the present invention, which will be described subsequently in greater detail, is to provide a new cellular phone supporting device apparatus and method which has many of the advantages of the mounting structures mentioned heretofore and many novel features that result in a cellular phone supporting device which is not anticipated, rendered obvious, suggested, or even implied by any of the prior art mounting structures, either alone or in any combination thereof.

To attain this, the present invention generally comprises a device for receiving and supporting a bag-type cellular phone when removed from the bag. The inventive device includes a housing having a through-extending upper compartment for receiving a main body of a cellular telephone. The housing further includes a closed lower compartment for receiving a battery pack of the telephone, whereby organized operation of the telephone utilizing a handset or auxiliary microphone can be accomplished within a vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cellular phone supporting device apparatus and method which has many of the advantages of the mounting structures mentioned heretofore and many novel features that result in a cellular phone supporting device which is not anticipated, rendered obvious, suggested, or even implied by any of the prior art tool guides, either alone or in any combination thereof.

It is another object of the present invention to provide a new cellular phone supporting device which may be easily and efficiently manufactured and marketed.

It is a further object of the present invention to provide a new cellular phone supporting device which is of a durable and reliable construction.

An even further object of the present invention is to provide a new cellular phone supporting device which is susceptible of a low cost of manufacture with regard to both materials and labor, and which accordingly is then susceptible of low prices of sale to the consuming public, thereby making such cellular phone supporting device s economically available to the buying public.

Still yet another object of the present invention is to provide a new cellular phone supporting device which provides in the apparatuses and methods of the prior art some of the advantages thereof, while simultaneously overcoming some of the disadvantages normally associated therewith.

Still another object of the present invention is to provide a new cellular phone supporting device for receiving and supporting a bag-type cellular phone when removed from the bag.

Yet another object of the present invention is to provide a new cellular phone supporting device which includes a housing having a through-extending upper compartment for receiving a main body of a cellular telephone, with the housing further including a closed lower compartment for receiving a battery pack of the telephone, whereby organized operation of the telephone utilizing a handset or auxiliary microphone can be accomplished.

These together with other objects of the invention, along with the various features of novelty which characterize the invention, are pointed out with particularity in the claims annexed to and foraging a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
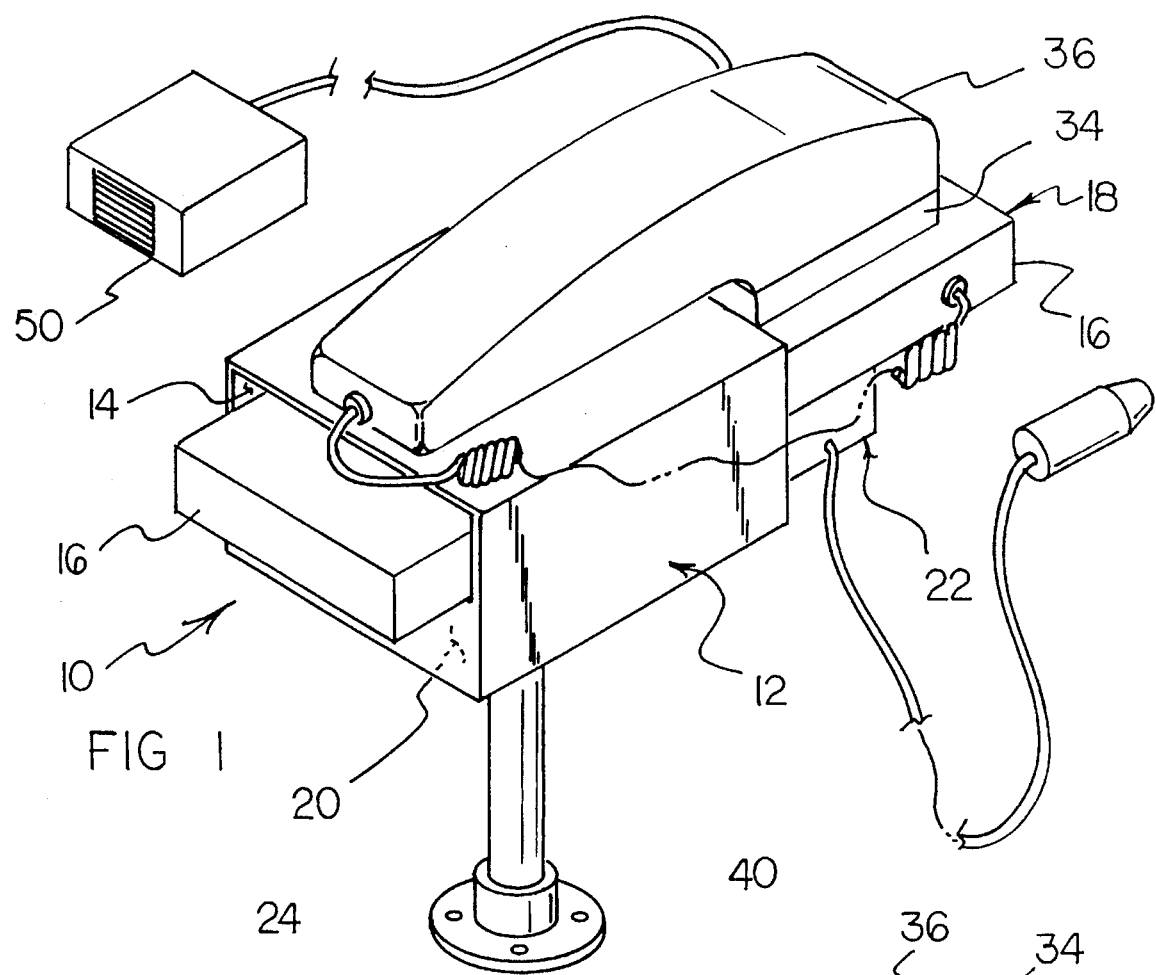
FIG. 1 is an isometric illustration of a cellular phone supporting device according to the present invention in use.

With reference now to the drawings, and in particular to FIGS. 1–5 thereof, a new cellular phone supporting device embodying the principles and concepts of the present invention and generally designated by the reference numeral 10 will be described.

Figure 2:
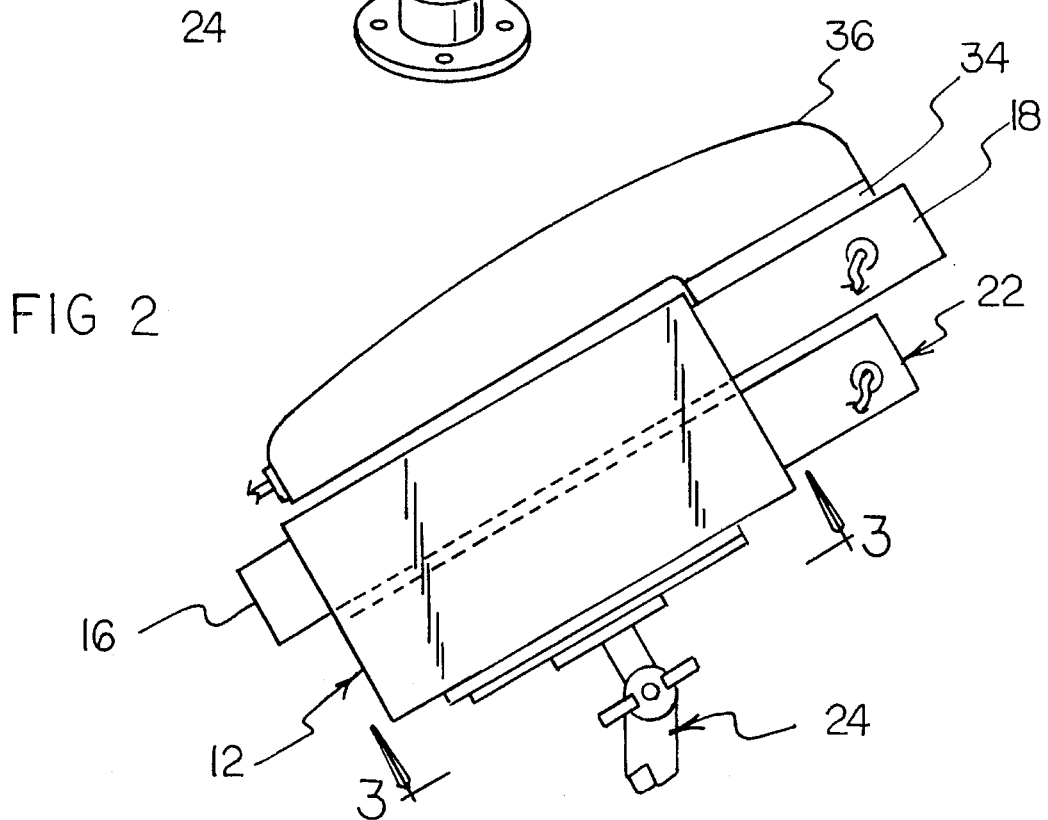
FIG. 2 is a side elevation view of a portion of thereof.

More specifically, it will be noted that the cellular phone supporting device 10 comprises a housing 12 having an upper compartment 14 for receiving a main body 16 of a cellular telephone 18, as shown in FIGS. 1 and 2 of the drawings. The housing 12 is further shaped so as to define a lower compartment 20 positioned beneath the upper compartment 14 for receiving a battery pack 22 of the cellular telephone 18. A support means 24 extends from the housing 12 for mounting the housing 12 relative to a supporting surface within a vehicle or other structure as desired by an end user. By this structure, a bag-type cellular telephone 18 can be supported in an organized fashion when removed from the unillustrated bag.

Figure 3:
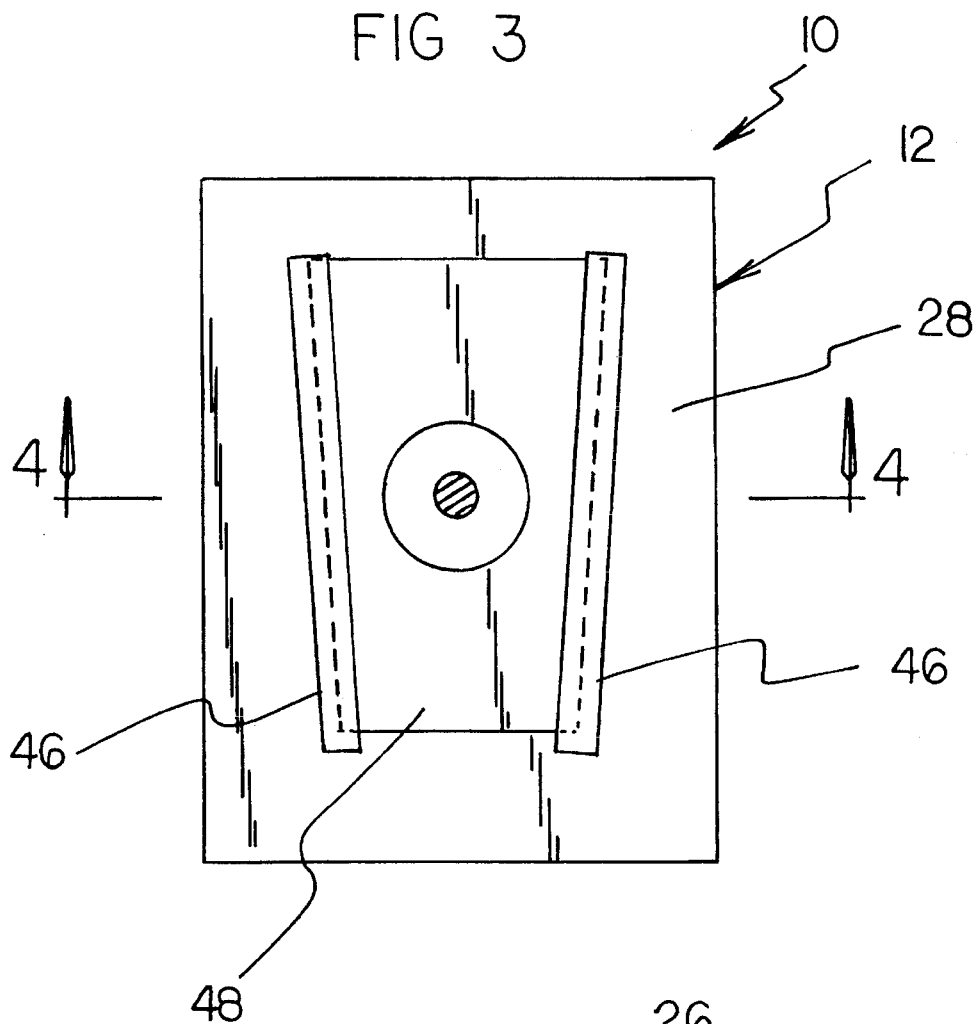
FIG. 3 is a cross sectional view taken along line 3—3 of FIG. 2.
Figure 4:
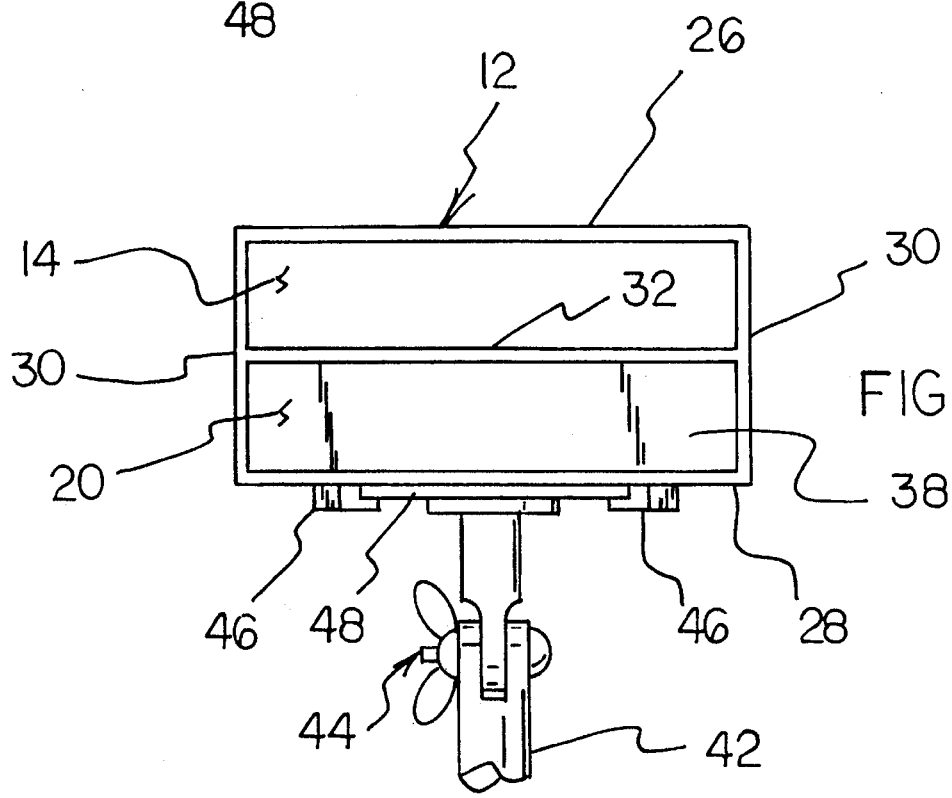
FIG. 4 is a cross sectional view taken along line 4—4 of FIG. 2.
Figure 5:
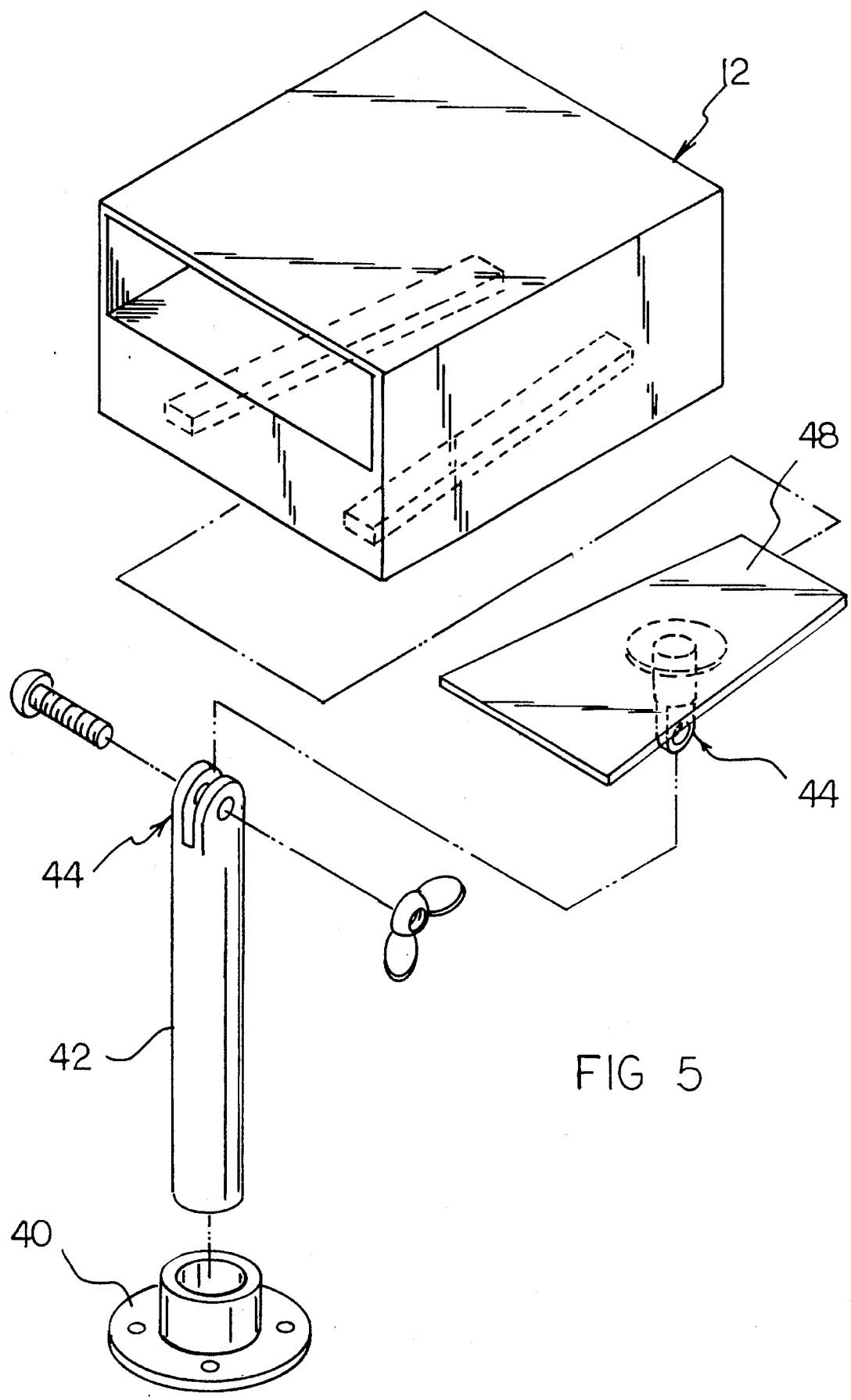
FIG. 5 is an exploded isometric illustration of the present invention.

Referring now to FIGS. 2 through 4 wherein the present invention 10 is illustration in detail, it can be shown that the housing 12 of the present invention 10 includes a top wall 26 spaced from a bottom wall 28. Lateral walls 30 extend between aligned lateral edges of the top and bottom walls 26 and 28. A dividing wall 32 extends between the top wall 26 and the bottom wall 28 and is secured to interior surfaces of the lateral walls 30 so as to separate an interior of the housing 12 into the upper compartment 14 and the lower compartment 20 as shown in FIG. 4 of the drawings. The upper compartment 14 extends completely through the housing 12 so as to permit a projection of the main body 16 of the telephone 18 therethrough as shown in FIGS. 1 and 2 of the drawings, with a handset receiver 34 of the telephone 18 engaging an edge of the top wall 26 so as to preclude a complete passage of the main body 16 through the upper compartment 14. A handset 36 of the telephone 18 can thus be engaged to the handset receiver 34 so as to extend along an exterior surface of the top wall 26 during periods of non-use of the telephone 18. With continuing reference to FIG. 4, it can be shown that in contrast to the upper compartment 14, the lower compartment 20 includes a rear wall 38 extending between the lateral walls 30 and between the dividing wall 32 and the bottom wall 28 so as to close an end of the lower compartment 20. The battery pack 22 can thus be positioned within the lower compartment 20 and precluded from sliding therethrough by the rear wall 38 against which the battery pack 22 abuts when positioned therein.

As shown in FIGS. 1, 3, 4, and 5, it can be shown that the support means 24 of the present invention 10 preferably comprises a base mount 40 securable to a support surface, such as a floor of an associated vehicle. A support stanchion 42 is removably or otherwise secured to the base mount 40 and projects upwardly therefrom. An adjustable angle coupler 44 is coupled to an upper end of the support stanchion 42 and extends therefrom to removably couple with the housing 12. To this end, a pair of spaced. channels 46 are mounted to an exterior surface of the bottom wall 28 and slidably receives a mounting plate 48 between the spaced channels 46. The mounting plate 48 may be equipped with suitable projections or the like which limit slidable placement relative to the spaced channels 46, however, it is preferable that the mounting plate include angled lateral edges, with the spaced channels 46 extending at an oblique angle relative to one another such that the mounting plate 48 is received within the spaced channels 46 and limited from continued sliding separation therefrom. In other words, as the mounting plate 48 is slid between the spaced channels 46, the angled lateral edges of the mounting plate will eventually wedge against the spaced channels 46 so as to secure the housing 12 to the adjustable angle coupler 44. By this structure, the housing 12, and the associated telephone 18, can be selectively and rapidly decoupled from a remainder of the support means 24 as desired. Further, the adjustable angle coupler 44 permits articulation of the housing 12 into a desired angled orientation relative to the support surface to which the support means 24 is secured during use of the device 10.

In use, the cellular phone supporting device 10 according to the present invention can be easily utilized for receiving and supporting a bag-type cellular phone when the telephone is removed from the bag. The device 10 permits ease of use of the handset 36 of the telephone 18, or alternatively, allows an auxiliary microphone 50 such as is shown in FIG. 1 to be coupled to the telephone 18 for use in lieu of the handset 36.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cellular phone supporting device comprising:

a housing having an upper compartment form receiving a main body of a cellular telephone, the housing being further shaped so as to define a lower compartment positioned beneath the upper compartment for receiving a battery pack of the cellular telephone; the housing including a top wall spaced from a bottom wall, with lateral walls extending between aligned lateral edges of the top and bottom walls, the housing further including a dividing wall secured to interior surfaces of the lateral walls and spaced between the top wall and the bottom wall so as to separate an interior of the housing into the upper compartment and the lower compartment, the upper compartment extending completely through the housing so as to permit a projection of the main body of the telephone therethrough, the lower compartment of the housing including a rear wall extending between the dividing wall and the bottom wall so as to close an end of the lower compartment and precluding a sliding of the battery pack therethrough;

a support means extending from the housing for mounting the housing relative to a supporting surface, the support means comprising a base mount securable to a support surface; a support stanchion removably secured to the base mount and projecting upwardly therefrom to removably couple within the housing;

a pair of space channels mounted to an exterior surface of the bottom wall of the housing; a mounting plate slidably positioned between the spaced channels, the mounting plate being secured to the adjustable angle coupler to permit coupling at various angles, the mounting plate including angled lateral edges, with the spaced channels extending at an oblique angle relative to one another such that the mounting plate being received within the spaced channels and limited from sliding separation therefrom by an engagement of the angled lateral edges with the spaced channels.

* * * * *